United States Patent
Tamai et al.

(10) Patent No.: US 7,725,474 B2
(45) Date of Patent: May 25, 2010

(54) APPARATUS AND METHOD FOR INFORMATION PROCESSING IN NETWORK SYSTEM

(75) Inventors: Yoshiyuki Tamai, Itami (JP); Masami Yamada, Osaka (JP); Yoshiki Tokimoto, Nishiwaki (JP); Kimie Mishima, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 687 days.

(21) Appl. No.: 10/820,066

(22) Filed: Apr. 8, 2004

(65) Prior Publication Data

US 2004/0236731 A1 Nov. 25, 2004

(30) Foreign Application Priority Data

May 21, 2003 (JP) ............................. 2003-143275

(51) Int. Cl.
*G06F 7/00* (2006.01)
*G06F 17/30* (2006.01)
(52) U.S. Cl. ..................................... 707/758; 713/300
(58) Field of Classification Search ................ 707/200, 707/1, 3
See application file for complete search history.

(56) References Cited

U.S. PATENT DOCUMENTS

| 5,155,857 | A | * | 10/1992 | Kunisaki et al. | 709/223 |
| 5,842,027 | A | * | 11/1998 | Oprescu et al. | 713/300 |
| 5,887,193 | A | * | 3/1999 | Takahashi et al. | 710/8 |
| 5,928,365 | A | * | 7/1999 | Yoshida | 713/324 |
| 6,459,496 | B1 | * | 10/2002 | Okazawa | 358/1.14 |
| 7,027,427 | B1 | * | 4/2006 | Tamura | 370/342 |
| 7,243,126 | B2 | * | 7/2007 | Sasaki et al. | 709/206 |
| 2001/0017620 | A1 | * | 8/2001 | Nara | 345/204 |
| 2002/0035620 | A1 | * | 3/2002 | Takahashi et al. | 709/220 |
| 2002/0059310 | A1 | * | 5/2002 | Choi | 707/200 |
| 2003/0106062 | A1 | * | 6/2003 | Shteyn et al. | 725/78 |
| 2003/0234953 | A1 | * | 12/2003 | Dawson et al. | 358/1.15 |
| 2004/0105031 | A1 | * | 6/2004 | Shibusawa | 348/570 |
| 2004/0255171 | A1 | * | 12/2004 | Zimmer et al. | 713/300 |

FOREIGN PATENT DOCUMENTS

| JP | 10-322387 | 12/1998 |
| JP | 2000-92121 | 3/2000 |
| JP | 2001-290621 | 10/2001 |
| JP | 2001-306511 | 11/2001 |
| JP | 2002-196996 | 7/2002 |

OTHER PUBLICATIONS

Japanese Office Action directed at counterpart foreign application JP-2003-143275 mailed on Jul. 1, 2008; 4 pages.

* cited by examiner

*Primary Examiner*—Hosain T Alam
*Assistant Examiner*—Usmaan Saeed
(74) *Attorney, Agent, or Firm*—Morrison & Foerster LLP

(57) ABSTRACT

An apparatus and method for information processing in a network system providing shared folders across a plurality of information processing apparatuses (personal computers) via network. A shared folder management table contains the IP addresses, identifiers of the personal computers, the names of shared folders, and the number of times or attempts to transmit data, etc. Searching of the shared folders is performed at given intervals of time and a search result is compared with the last search result. Based on the search result, a new management data founded is registered in the management table. If a destination personal computer remains inaccessible longer than predetermined time, management data of such personal computers are deleted from the management table.

12 Claims, 6 Drawing Sheets

SHARED FOLDER MANAGEMENT TABLE

| IP ADDRESS | PC IDENTIFIER | NAME OF SHARED FOLDER | POWER STATE ON/OFF | POWER OFF TIME | NUMBER OF TIMES OF DATA TRANSMISSION |
|---|---|---|---|---|---|
| 192.168.0.1 | PC006 | comDir | OFF | 2003/03/19 21:23 GST | 6 |
| 192.168.0.10 | PC424 | work | ON | -- -- | 0 |
| 192.168.0.10 | PC424 | comDir | ON | -- -- | 1 |
| 192.168.0.32 | SV636 | tmp | OFF | 2003/03/18 18:45 GST | 3 |
| ... ... | ... ... | ... ... | ... ... | ... ... | ... ... |
| 192.168.2.224 | PRNSV04 | spi | ON | -- -- | 0 |

“APPARATUS AND METHOD FOR
INFORMATION PROCESSING IN NETWORK
SYSTEM

This application is based on application No. JP2003-143275 filed in Japan, the contents of which are hereby incorporated by reference.

BACKGROUND OF THE INVENTION

1. Field of the Invention

This invention relates to an apparatus and method for information processing in a network system.

2. Prior Art

A multi-function peripheral (hereinafter referred to as an "MFP") having printer, facsimile, and scanner functions is widely used as an input/output device of information processing apparatuses (personal computers). Connecting a plurality of personal computers and MFP to a network for information processing use is also widely practiced. An approach in relation to this is disclosed in, for example, Japanese Laid Open Patent Publication JP2000-092121.

In such a network system, a plurality of personal computers connected to the network share data. Each of personal computers is able to perform information processing such as reading shared data from folder, or transmitting shared data to store into folder via network.

Files in which such data has been stored are sorted and arranged in subdirectories which are called folders. A folder that is shared across a plurality of personal computers via the network so that the users can access the data stored in the folder is called a "shared folder." In the following description of the present invention, the term "shared folder" is used in this sense.

In a network system where a plurality of personal computers are connected to a network, taking advantage of shared folders, when, for example, an MFP attempts to transmit data to a particular personal computer (hereinafter referred to as a destination personal computer), it may happen that at the present time, data transmission is unsuccessful while the destination personal computer is in a power-off state, although at the last time, data transmission was successful when the destination personal computer was in a power-on state. Or, it may happen that at the present time, data transmission is unsuccessful while the destination personal computer is disconnected from the network, although at the last time, data transmission was successful when the destination personal computer was connected to the network and was in the power-on state.

Like this, a disadvantage with the above network system is that, when the destination personal computer is in the power-off state or disconnected from the network, that personal computer cannot be selected as the destination to transmit data to.

Another disadvantage with the above network system is that, when a plurality of destination personal computers are registered in advance and configured to be displayed so that a selection from them is made when data transmission is performed, it cannot be determined whether or not each of these destination personal computers is in a data receivable state.

This invention is aimed to solve the foregoing problems.

SUMMARY OF THE INVENTION

1. It is a primary object of this invention to provide an apparatus and method for information processing in a network system that can provide information to identify information processing apparatuses (personal computers) which are capable or not of transmitting and receiving data among a plurality of information processing apparatuses interconnected via a network.

2. It is another object of this invention to provide an apparatus and method for information processing in a network system that can provide information to determine whether or not data can be transmitted to and received from shared folders which are shared among a plurality of information processing apparatuses interconnected via a network, based on the states of each information processing apparatus.

3. It is yet another object of this invention to provide an apparatus and method for information processing in a network system that can provide information to determine whether or not data can be transmitted to and received from shared folders which are shared among a plurality of information processing apparatuses interconnected via a network, together with information on the states of each information processing apparatus.

4. Other objects and advantages of this invention will be apparent from the following detailed description of the invention with reference to the accompanying drawings.

DETAILED DESCRIPTION OF THE PREFERRED EMBODIMENTS

Figure 1:
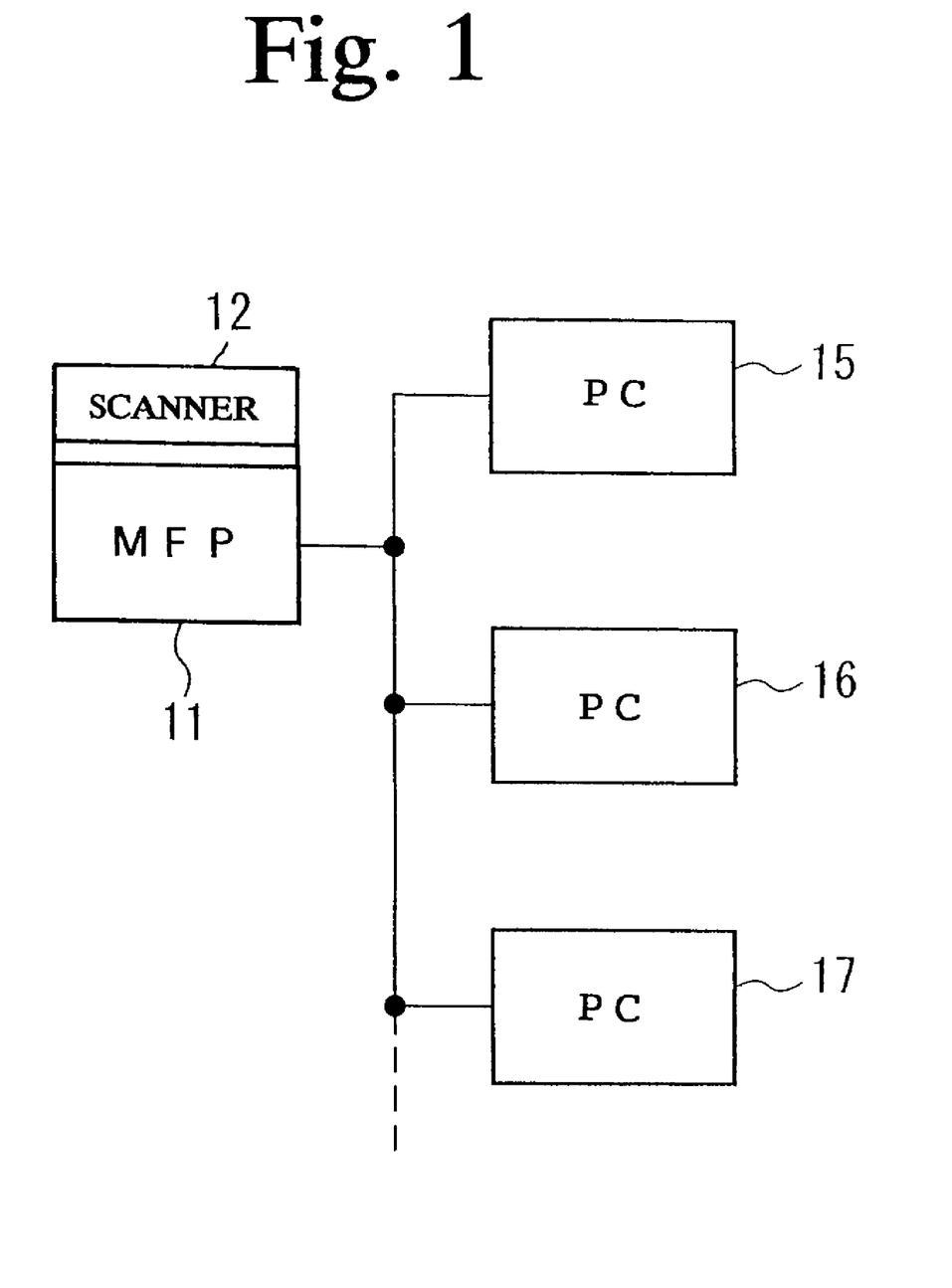
FIG. 1 is a block diagram showing a network information processing system according to a preferred embodiment of this invention.

This invention now is described more fully by way of its preferred embodiment. FIG. 1 is a block diagram describing a network information processing system (hereinafter referred to as a network system) according to a preferred embodiment of this invention. The network system is composed of a multi-function peripheral (hereinafter referred to as an "MFP") 11 with a scanner 12 to read image information and a plurality of personal computers connected to the MFP 11 via a network formed by a communications line (such as a LAN). In this network system, three personal computers (PC15, PC16, and PC17) are connected to the MFP 11 via a communication line; however, the number of personal computers connected to the MFP is not so limited. The MFP is an information processing apparatus having a plurality of functions such as printer, facsimile, and scanner functions.

The above personal computers may include ordinary personal computers and personal computers functioning as printer servers, besides the MFP 11. The communications line may be embodied in any of the following: a wire circuit, a wireless channel, or a communications means using infrared rays.

The MFP 11 stores image data generated by reading information with the scanner 12 into shared folders provided in a storage device of MFP 11 and creates a shared folder management table in which management data (bibliographic information, attributes, etc.) is registered. The MFP itself and the personal computers PC15, PC16, and PC17 have shared folders respectively and can access image data stored in the shared folders on other personal computers via the network.

As will be described later, because the management data of bibliographic information, attributes, etc. is registered in the shared folder management table, when a user is accessing image data stored in a shared folder, the user can know the bibliographic information, attributes, etc. of the target image data by referring to the shared folder management table on the MFP 11.

Figure 2:
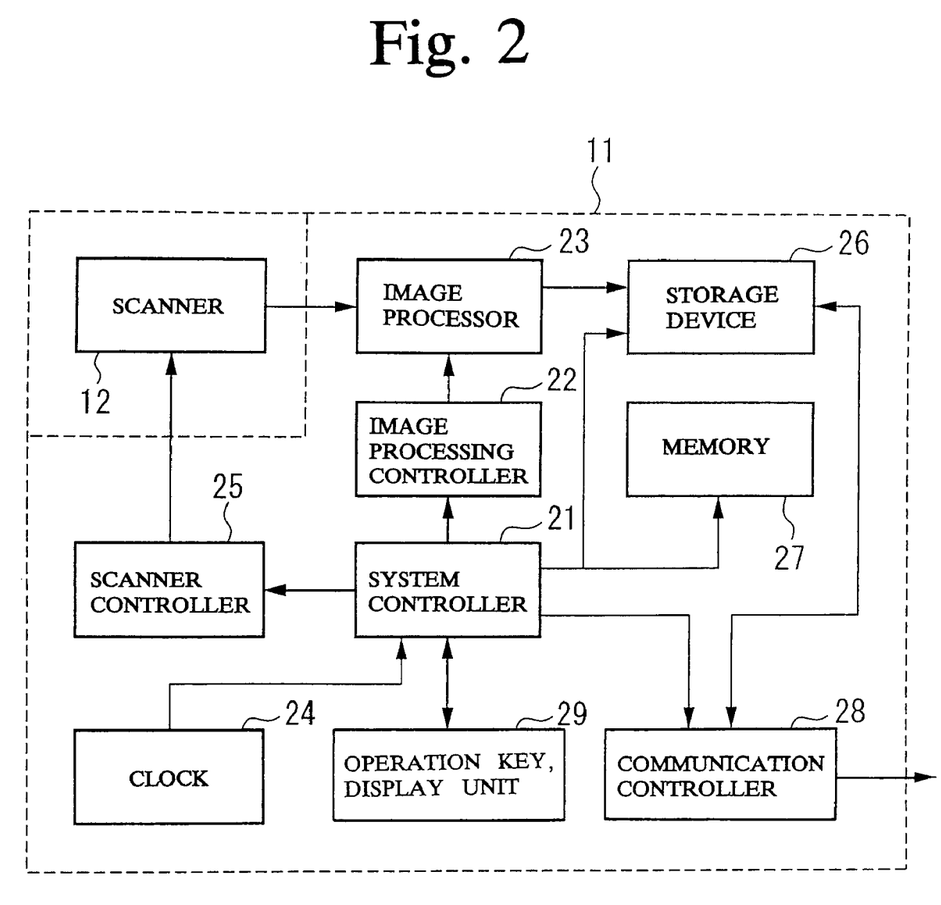
FIG. 2 is a bock diagram showing the configuration of a multi-function peripheral (MFP) of the preferred embodiment.

FIG. 2 is a block diagram showing the configuration of the MFP 11 of the preferred embodiment. The MFP 11 is composed of a system controller 21, an image processing controller 22, an image processor 23, a clock 24, a scanner controller 25, a storage device 26, a memory 27, a communications controller 28, an operation key and display unit 29, etc. The system controller 21, image processing controller 22, image processor 23, clock 24, and scanner controller 25 are shown as the function blocks performed by the CPU of the MFP 11. The storage device 26, memory 27, communications controller 28, operation key and display unit 29 are the components which are managed by the system controller 21.

The system controller 21 executes an overall control of the MFP operations including image processing, shared folder searching, and displaying search results. The clock 24 gives present time by outputting a clock signal as one of control information to the system controller 21.

The scanner controller 25 controls the operation of the scanner 12 connected to the MFP. Image data read by the scanner 12 is processed by the image processor 23 under the control of the image processing controller 22 and the processed image data is transferred to the storage device 26 and stored into a shared folder in the storage device 26. The image data stored in the shared folder in the storage device 26 can be read from personal computers connected to the network.

The memory 27 is used to store and retain the shared folder management table and other information. The communications controller 28 controls communication among personal computers connected to the network.

The operation key and display unit 29 consists of an operating device and a display device. The operating device is used for the user to issue instructions about image scan operation to the scanner 12 and other commands and to enter data. The display device is used to display the shared folder management table and other information.

Then, shared folder handling that is executed by the system controller 21 of the MFP 11 is discussed.

Figure 6:
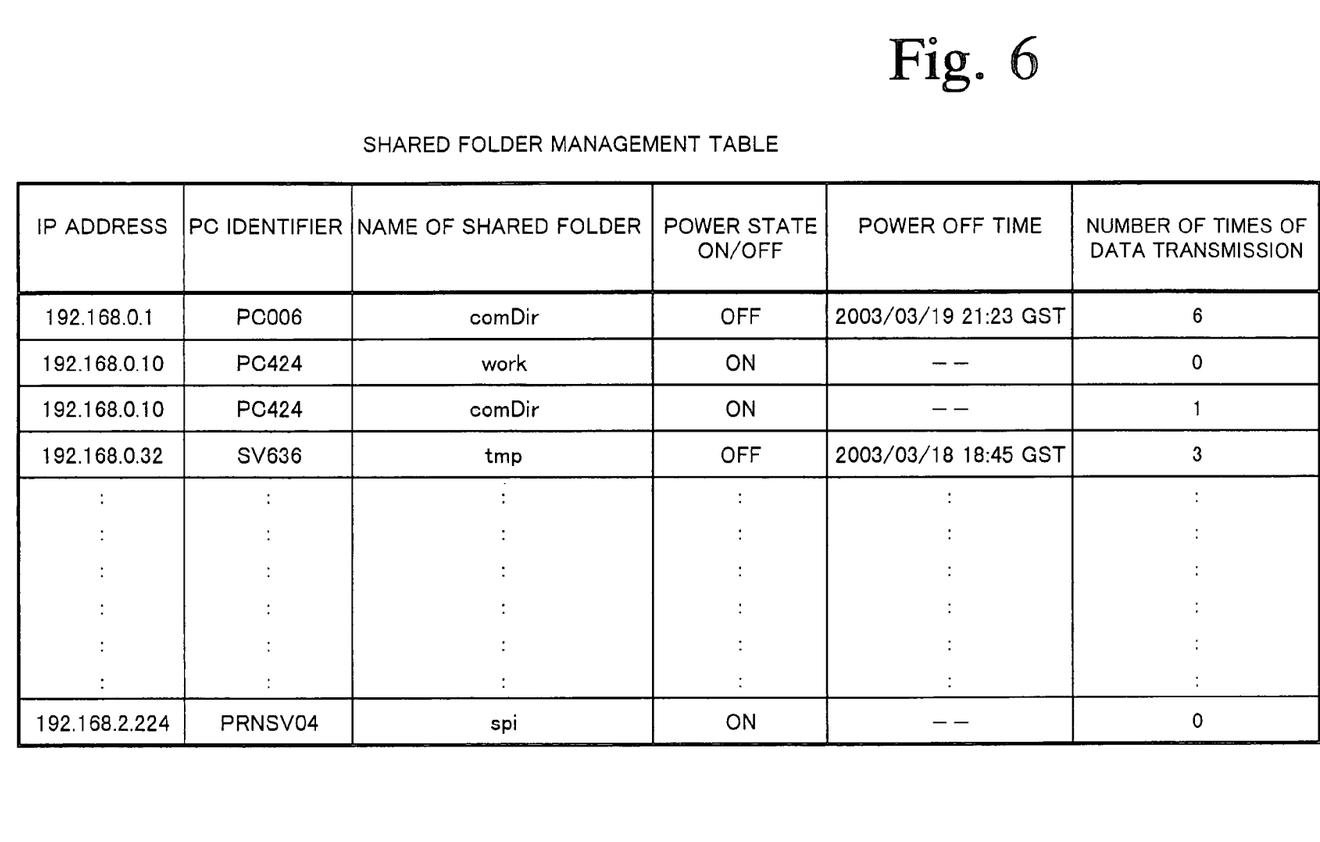
FIG. 6 shows an example of the shared folder management table.

First, the shared folder management table is briefly explained. An example of the shared folder management table is shown in FIG. 6. The shared folder management table contains the following information: the IP address and identifier of a personal computer connected to the network; the name of a shared folder of the personal computer; power state (power ON/OFF state) of the personal computer; power off time when the personal computer was powered OFF; and the number of times of image data transmission or number of times of attempting image data transmission (hereinafter referred to as the number of times of image data transmission) to the shared folder.

Registration of management data into the shared folder management table is briefly explained. Searching of shared folders is performed at given intervals of time T1 (search interval T1). Upon finishing of each search, the result of the present search is compared with the result of the last search.

By the comparison of both results of two successive searches, if it is detected that a shared folder having new image data has been created, the management data is not yet registered in the shared folder management table. Thus, when a new shared folder that was not registered at the last search has been found by the present search, management data about the new shared folder is added to the shared folder management table. The power state of the personal computer having the new shared folder is set to ON, the power off time cleared to 0, and the number of times of image data transmission to the personal computer is cleared to 0.

When shared folder having image data that was registered in the shared folder management table at the last search was not found by the present search, the personal computer having the shared folder has been set in the power OFF state, and access to the personal computer via the network is now impossible. Then, the set values about the personal computer registered in the shared folder management table are checked. When the power state of the personal computer is set to ON, it is changed to OFF, and the present time is registered as the power OFF time.

When a shared folder that was registered at the last search is found by the present search as well, the personal computer having the shared folder has been set in the power ON state. The set values about the personal computer registered in the shared folder management table are checked. When the power state of the personal computer is set to OFF, it is changed to ON, and the power off time is erased.

Next, deletion of management data from the shared folder management table is briefly explained. Searching of shared folders on the personal computers connected to the network is performed at given intervals of time T1. Upon finishing of a search, the result of the present search is compared with that of the last search.

By the comparison of both results of two successive searches, if a shared folder having a image data has been stored is found, but management data is not registered in the shared folder management table, the personal computer having the shared folder has been set in the power OFF state and access to the personal computer via the network is now impossible. Then, the set values about the personal computer registered in the shared folder management table are checked. When the power state of the personal computer is set to ON, it is changed to OFF, and the present time is registered as the power OFF time.

Meanwhile, when the MFP being instructed to transmit image data to a particular personal computer, it performs shared folder searching at intervals of time T2 (search interval T2) that is shorter than time T1 (search interval T1), and transmits the image data thereto. At this time, if the destination personal computer is in the power OFF state, the MFP is unable to access the destination personal computer, but the MFP retries to get access to the destination personal computer.

Then, when the number of times to access the destination personal computer to transmit the image data exceeds a predetermined number n, and when time elapsed from time Toff, when the destination personal computer was powered OFF, until the present time Tnow (Tnow−Toff) exceeds predetermined time TE (TE=T2×n), that is, if (Tnow−Toff)>(TE=T2× n), the management data of the destination personal computer is deleted from the shared folder management table.

In other words, if the number of times to access the destination personal computer exceeds the predetermined number n, and if the time elapsed from time Toff (power off time of the destination personal computer) until the present time Tnow becomes longer than the predetermined time TE, the MFP stops image data transmission to the destination personal computer and deletes the management data of the personal computer from the shared folder management table.

Next, displaying the shared folder management table is discussed.

(1) Displaying a list of destination personal computers: The MFP performs shared folder searching at given intervals of time T1 (search interval T1), and outputs the shared folder management table to the display. In the shared folder management table displayed on the display unit 29, personal computers being in the power ON state are shown in a color different from normal display, for example, in blue. Also, personal computers being in the power OFF state are shown in a color different from normal display, for example, in gray, in the shared folder management table displayed on the display unit 29.

(2) Displaying the list with a personal computer being selected as the destination: Personal computers selected as the destination are displayed in the shared folder management table and memorized. If a personal computer being in the power OFF state is selected, anticipated consequence of continuing operation of data transmission to the personal computer selected as the destination is displayed on the display unit 29. For example, a message such as "Impossible the data transmission" or "Data transmission will be delayed" is displayed.

(3) When the shared folder is searched at intervals of search cycle time T2: The MFP searches the shared folder to look for a personal computer selected as the destination at intervals of time T2 (search interval T2) that is shorter than time T1 (search interval T1) of shared folder searching for updating the shared folder management table.

When the destination personal computer is found, and if its power state is set to OFF in the shared folder management table; the MFP executes data transmission and deletes a record of the personal computer selected as the destination in the shared folder management table.

When the destination personal computer is found, and if its power state is set to ON in the shared folder management table, the MFP executes data transmission.

If the destination personal computer is not found, but its power state is set to ON in the shared folder management table, the MFP displays anticipated consequence of continuing operation of data transmission. For example, a message such as "Data transmission is impossible" or "Data transmission will be delayed" is displayed.

Figure 3:
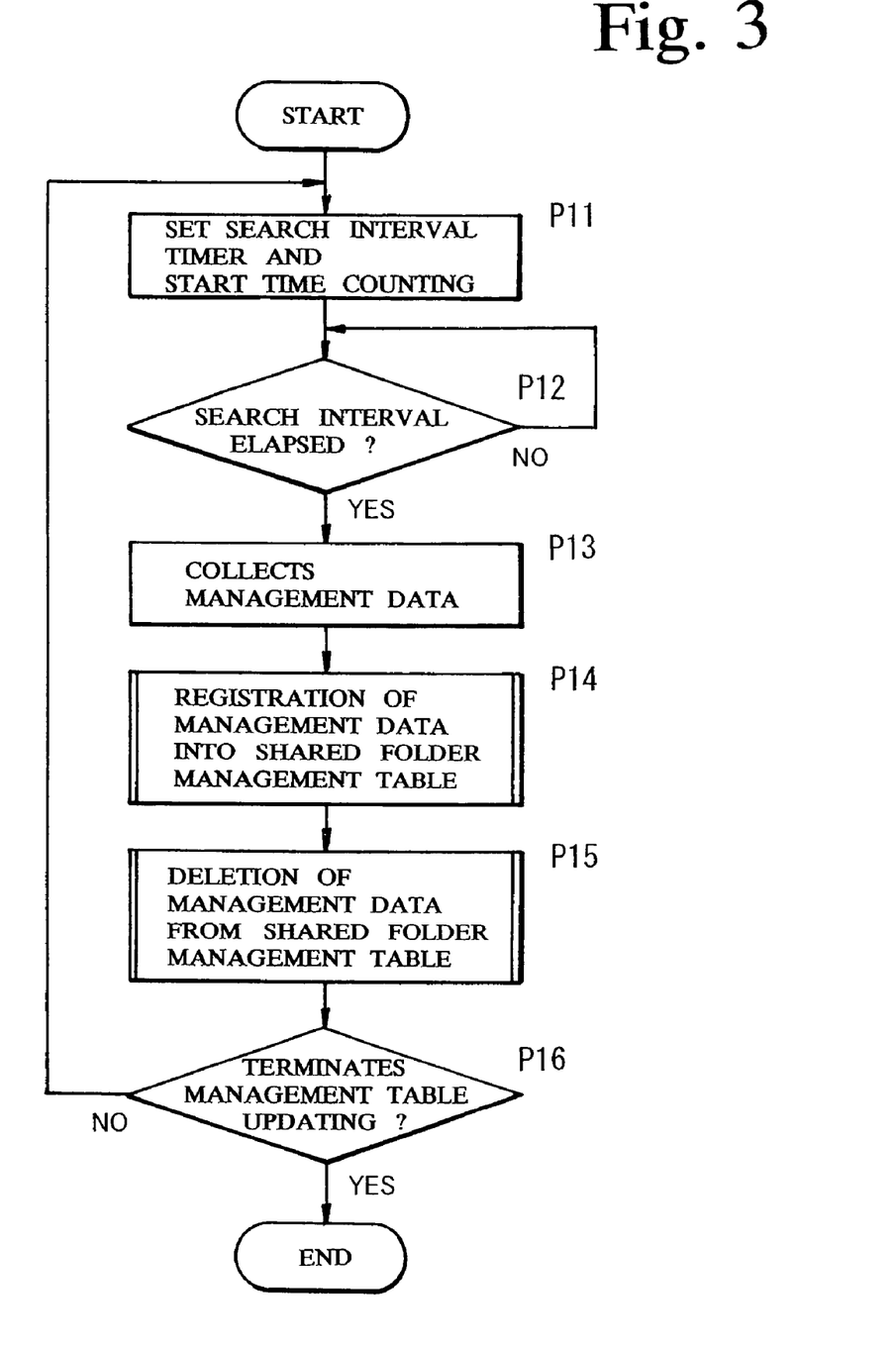
FIG. 3 is a flowchart to explain how the MFP registers and deletes management data into/from a shared folder management table.

FIG. 3 is a flowchart to explain the control operation of registration and deletion of management data into/from the shared folder management table executed by the MFP.

First, a search interval T1 is set on a timer counting a search interval for searching shared folders on the personal computers connected to the network, and the timer is started (step P11), and waits until the search interval T1 is elapsed (step P12).

When search interval T1 has been elapsed, collects management data from the personal computers connected to the network (step P13).

A new management data is registered into the shared folder management table (step P14). If a personal computer connected to the network still remains in the power OFF state after a plurality of number of times of searching, deletes the management data of the personal computer from the shared folder management table (step P15).

It is determined whether or not a command to finish updating the shared folder management table is issued (step P16). If there is no command to finish the update operation, the control returns to the step P11 and continues updating the shared folder management table. If a command to finish the update operation is issued, finishes the update operation and returns to a main routine.

Figure 4:
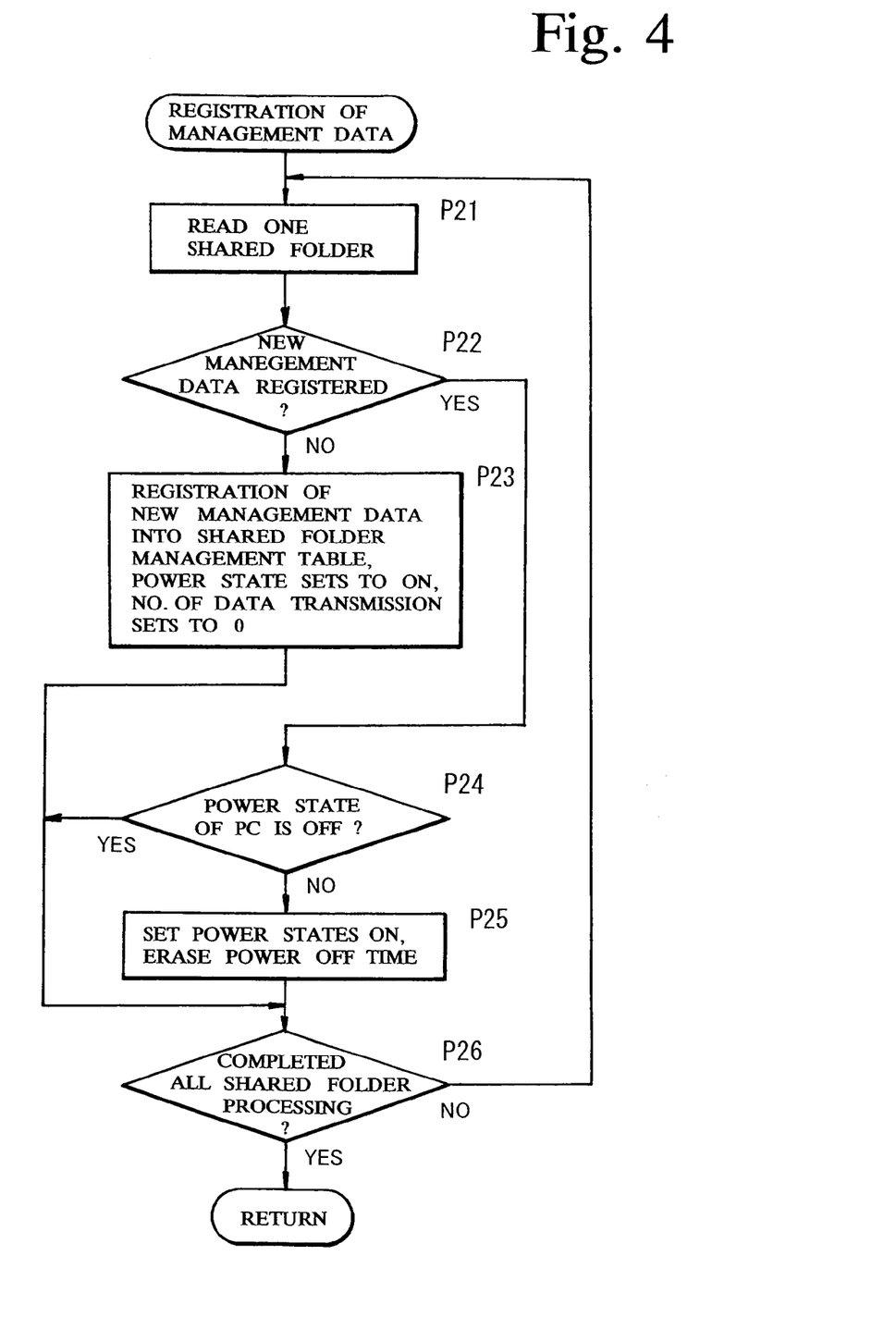
FIG. 4 is a flowchart to explain details of registering new management data into the shared folder management table.

FIG. 4 is a flowchart to explain details of registration processing of new management data into the shared folder management table, described in step P14 in the flowchart of FIG. 3.

First, one shared folder is read (step P21). It is determined whether or not management data of a shared folder storing new image data that has been read by the scanner 12 has been registered into the shared folder management table (step P22). If such management data of shared folder has not been registered in the shared folder management table, such a management data of the new shared data is registered into the shared folder management table, and sets the power state to ON, erases the power OFF time, and clears the count value of a counter counting the number of data transmission times to 0 (step P23). The control proceeds to step P26.

If the above management data of the shared folder has been registered in step P22, it is determined whether or not the power state of the personal computer having the shared folder registered in the shared folder management table is OFF (step P24). If the power state is not OFF, the power state is set to ON and the power OFF time is erased (step P25) and the control proceeds to step P26. If the power state is OFF as determined in step P24, the control immediately proceeds to step P26.

In step P26, it is determined whether or not processing of all shared folders has been completed. If it is not completed, the control returns to step P21. If it is completed, the control returns to the main routine.

Figure 5:
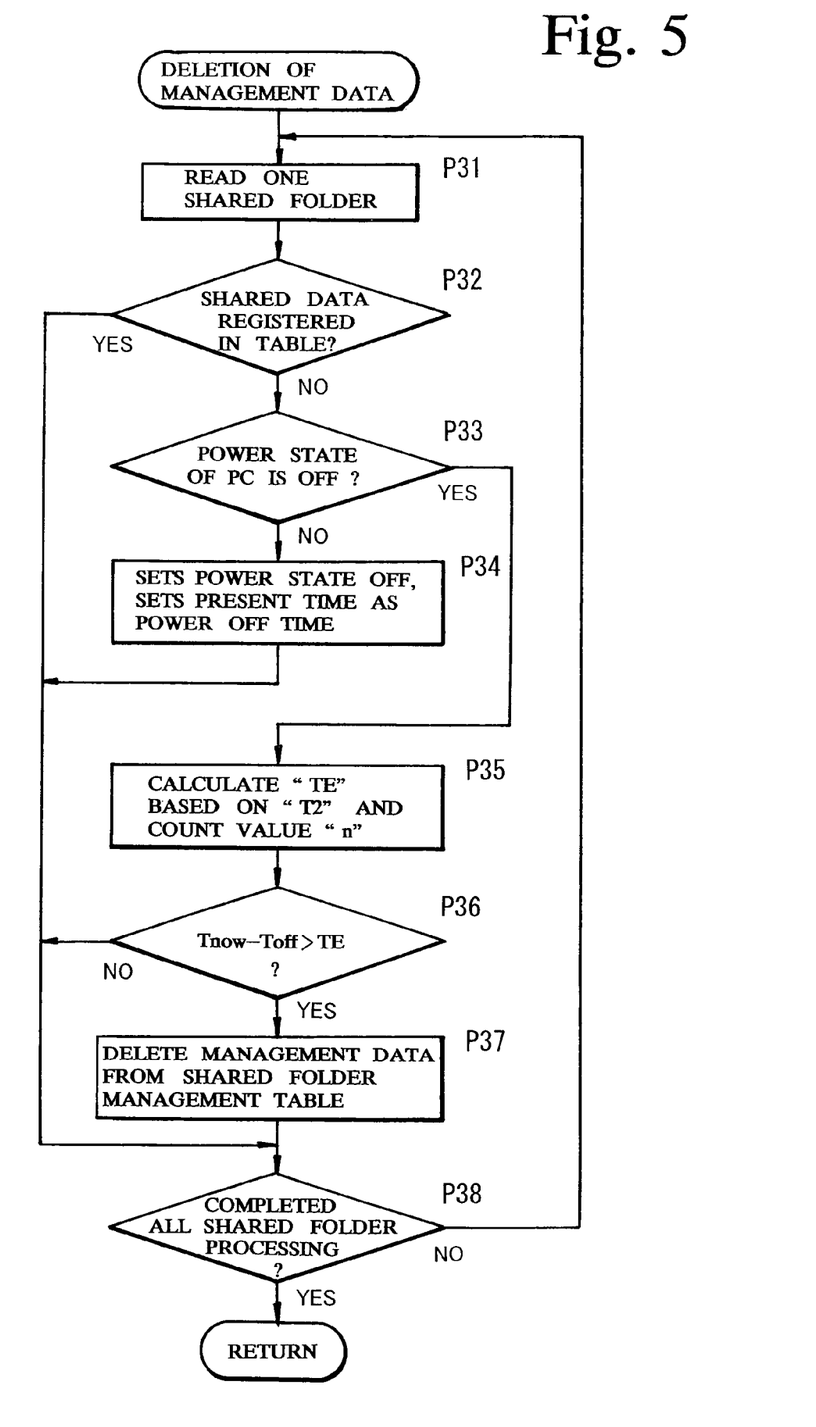
FIG. 5 is a flowchart to explain details of deleting inactive management data from the shared folder management table.

FIG. 5 is a flowchart to explain details of deletion processing of management data from the shared folder management table, described in step P15 in the flowchart of FIG. 3.

First, the one shared folder is read (step P31). It is determined whether or not management data of the shared folder has been registered into the shared folder management table (step P32). If it is not registered, it is determined whether or not the power state of the personal computer having shared folder is set to OFF in the shared folder management table (step P33). If power state is not set to OFF, the power state is set to OFF, and the present time is set as the power OFF time (step P34). Then, the control proceeds to step P38. If the shared folder management data has been registered into the shared folder management table in step P32, the control immediately proceeds to step P38.

If the power state is set to OFF as determined in step P33, time TE (TE=T2×n) is calculated, based on search interval T2, that is predetermined for search the shared folder management table and look for a particular personal computer to which to data transmission, and the count value n of a counter counting the number of data transmission times (step P35).

If the count value n exceeds a predetermined number, it is determined whether or not time elapsed from time Toff, when the destination personal computer was powered OFF, until the present time Tnow (Tnow−Toff) exceeds time TE (TE=T2×n) (step P36). If it is so, that is, (Tnow−Toff)>TE (TE=T2×n), the management data of such personal computers is deleted from shared folder management table (step P37). If not so, as determined in step P36, the procedure immediately proceeds to step P38.

In other words, if the number of times the destination to transmit the data exceeds the predetermined number, and if the time elapsed from time Toff, when the destination personal computer was powered OFF, until the present time Tnow becomes longer than the predetermined time TE, data transmission to the destination personal computer is stopped and deletes the management data from the shared folder management table.

In step P38, it is determined whether or not all shared folders have been checked. If it is not, the control returns to step P31. If it is so, the control returns to the main routine.

As described in detail hereinbefore, the MFP of the present invention performs searching of shared folders of a plurality of information processing apparatuses (personal computers) connected to the MFP via the network. Upon completion of a search, the result of the present search with the result of the last search are compared, and displays the states of the personal computers associated with the shared folders in a list which is updated, according to the result of the comparison. At given intervals of time, the searching is performed and the comparison result is reviewed. During this interval, the power state of a destination personal computer may change. The displayed list includes information on such power state change and indications as to whether it is possible to transmit data to each personal computer.

By referring to the thus displayed information about the personal computers connected to the network, before data transmission, the MFP user can know that data transmission is possible or impossible and information processing across the personal computers connected to the network can be performed efficiently.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An information processing apparatus, comprising:
    a memory unit which stores a shared folder management table which contains information about a plurality of shared folders and states of a plurality of information processing apparatuses being associated with the shared folders, wherein each of said shared folders stores image data therein and is shared by one or more of the plurality of information processing apparatuses connected to a network;
    a search controller which executes searching of said shared folders;
    a comparator which compares shared folders of a present search with those of a last search;
    an updating controller which updates said states of the information processing apparatuses in said shared folder management table based on present states of the information processing apparatuses determined from the information about shared folders stored in said shared folder management table and a result of the comparison made by said comparator; and
    a display unit which displays updated states of the information processing apparatuses;
    wherein said states of a plurality of information processing apparatuses in said shared folder management table include a power ON/OFF state of each information processing apparatus;
    said updated controller updates the power ON/OFF state of each information processing apparatus based on present ON/OFF states of the information processing apparatuses determined from the information about shared folders stored in said shared folder management table and the result of the comparison made by said comparator; and
    said display unit displays updated states of information processing apparatuses in a manner according to the updated power ON/OFF state of each information processing apparatus.

2. The information processing apparatus according to claim 1, further comprising:
    a document reader which reads a document, and outputs image data; and
    a communication controller which transmits the image data to said shared folders.

3. The information processing apparatus according to claim 1, wherein said search controller executes the shared folder searching at intervals of a first predetermined time.

4. The information processing apparatus according to claim 3, wherein said updating controller changes the power ON/OFF state of an information processing apparatus into OFF state when a shared folder, which is stored in said shared folder management table associated with the information processing apparatus, was found by the last search but is not found by the present search.

5. The information processing apparatus according to claim 1, further comprising:
    a selection controller which allows selection of a destination to which image data is transmitted,
    wherein, when said destination is selected, said display unit displays the updated states of the information processing apparatuses.

6. A method for information processing which is used to handle information about a plurality of information processing apparatuses interconnected by a network, said method comprising:
    searching a plurality of shared folders stored in a memory unit which stores a shared folder management table which includes information about the shared folders and states of a plurality of information processing apparatuses having the shared folders, wherein each of said shared folders stores image data therein and is shared by one or more of the plurality of information processing apparatuses connected to a network;
    comparing shared folders obtained by a present search with those of a previous search;
    updating said states of the plurality of information processing apparatuses in said shared folder management table based on present states of the information processing apparatuses determined from the information about shared folders stored in said shared folder management table and a result of the comparison; and
    displaying the states of the information processing apparatuses in a manner according to the updated states thereof
    wherein, when states of the plurality of information processing apparatuses in said shared folder management table include a power ON/OFF state of each information processing apparatus, the power ON/OFF state of each information processing apparatus is undated based on present ON/OFF states of the information processing apparatuses determined from the information about shared folders stored in said shared folder management table and the result of the comparison and displayed on the display unit in a manner according to the undated power ON/OFF state of each information processing apparatus.

7. The method for information processing according to claim 6, further comprising:
    reading a document by a document reader and output the image data; and
    transmitting image data to said shared folders.

8. The method for information processing according to claim 6, wherein shared folder searching is executed at intervals of first predetermined time.

9. The method for information processing according to claim 6, wherein, the power ON/OFF state of the information processing apparatus is changed into the OFF state, when a shared folder was found by the last search but is not found by the present search.

10. The method for information processing according to claim 6, further comprising:

selecting a destination to which image data is transmitted, wherein, when said destination is selected, said display displays the states of the information processing apparatuses.

11. The information processing apparatus according to claim 5, wherein said search controller executes the shared folder searching at intervals of a first predetermined time when said destination is not selected, and executes the shared folder searching at intervals of a second predetermined time shorter than the first predetermined time when said destination is selected.

12. A method for information processing according to claim 10, wherein said shared folder searching is executed at intervals of a first predetermined time when said destination is not selected, and said shared folder searching is executed at the intervals of a second predetermined time shorter than the first predetermined time when said destination is selected.

* * * * *